United States Patent [19]

Hezemans et al.

[11] Patent Number: 5,179,544
[45] Date of Patent: Jan. 12, 1993

[54] CONTROL SYSTEM FOR THE MAGNETIC HEAD OF A MAGNETO-OPTICAL DISC APPARATUS

[75] Inventors: Cornelius A. Hezemans; Johannes M. M. Hensing, both of Eindhoven, Netherlands

[73] Assignee: U.S. Philips Corporation, New York, N.Y.

[21] Appl. No.: 799,912

[22] Filed: Nov. 26, 1991

Related U.S. Application Data

[63] Continuation of Ser. No. 452,986, Dec. 19, 1989.

[30] Foreign Application Priority Data

Mar. 28, 1989 [NL] Netherlands ............. 8900752

[51] Int. Cl.$^5$ .................... G11B 11/00; G11B 17/20
[52] U.S. Cl. .................... 369/13; 369/215; 360/59; 360/114
[58] Field of Search .............. 369/13, 52, 53, 54, 369/215; 360/59, 114

[56] References Cited

U.S. PATENT DOCUMENTS

| | | | |
|---|---|---|---|
| 4,325,134 | 4/1982 | Langley et al. | 369/53 |
| 4,706,232 | 11/1987 | Funada et al. | 369/13 |
| 4,750,152 | 6/1988 | Yonekubo et al. | 369/13 |
| 4,802,021 | 1/1989 | Makagawa et al. | 369/13 |
| 4,803,674 | 2/1989 | Nakao et al. | 369/13 |
| 4,829,508 | 5/1989 | Arita | 369/215 |
| 4,850,695 | 6/1989 | Mikuriya et al. | 369/53 |
| 4,868,802 | 9/1989 | Kobori | 369/13 |
| 4,879,703 | 11/1989 | Kaku et al. | 369/54 |

FOREIGN PATENT DOCUMENTS

| | | | |
|---|---|---|---|
| 0336423 | 10/1989 | European Pat. Off. | 369/13 |
| 63-177304 | 7/1988 | Japan | 369/13 |
| 1-287849 | 11/1989 | Japan | 369/13 |

Primary Examiner—Eugene R. LaRoche
Assistant Examiner—Tan Nguyen
Attorney, Agent, or Firm—David R. Treacy

[57] ABSTRACT

A device for inscribing and/or reading a magneto-optical disc (7), comprising a frame carrying a turntable which is rotatable about an axis of rotation (11), an optical unit (19) which comprises an objective (21) and an actuator for moving the objective in a direction parallel to such axis of rotation, and, viewed along such axis, a magnetic unit (59) arranged opposite to and spaced from the optical unit. The optical unit and the magnetic unit are movable in a plane which is oriented transversely of said axis of rotation. The magnetic unit comprises a coil (131) arranged on a coil former (129) and a further actuator (24) for moving the coil in a direction parallel to the axis of rotation of the turntable. The device further comprises a measurement and control system for detecting, during operation of the device, the distance between a reference plane (R) of the magnetic unit and the magneto-optical disc and for controlling the position of the coil.

11 Claims, 7 Drawing Sheets

CONTROL SYSTEM FOR THE MAGNETIC HEAD OF A MAGNETO-OPTICAL DISC APPARATUS

This is a continuation of application Ser. No. 07/452,986, filed Dec. 19, 1989.

BACKGROUND OF THE INVENTION

1. Field of the Invention

The invention relates to a device for inscribing and-/or reading a magneto-optical information carrier comprising a frame carrying a turntable which is rotatable about an axis of rotation, for supporting the information carrier, an optical unit which includes an objective for concentrating a radiation beam to form at least one radiation spot in a focusing plane, an actuator for moving the objective in a direction parallel to said axis of rotation, and a magnetic unit which, viewed according to said axis of rotation, is arranged opposite to and spaced from the optical unit, which magnetic unit comprises means for generating a magnetic field which extends into said focusing plane, the optical unit and the magnetic unit being arranged to be movable in a plane transverse to said axis of rotation.

2. Description of the Related Art

Such a device is known from published West German Offenlegungsschrift DE 37 23 134 (herewith incorporated by reference). Such prior art device for magneto-optically inscribing a magneto-optical disc comprises a housing having a cover which can be opened and closed to insert or remove a magneto-optical disc. During operation the magneto-optical disc loaded into the housing is held on a turntable by a disc-pressure member and is rotated by a drive motor. The drive motor is secured to a frame accommodated in the housing. The housing further accommodates a slide which is movable over rectilinear guide means in a radial direction relative to the axis of rotation of the turntable. The slide is constructed as a tilted U-shaped part having two mutually parallel radial limbs. One of the limbs carries an lens for concentrating a radiation beam to form a radiation spot and the other limb carries a permanent magnet for producing a magnetic bias field. The lens and the magnet are arranged opposite one another and are each situated at one side of the disc which is supported by the turntable.

An information carrier to be used for magneto-optical recording is provided with a thin film of a ferromagnetic or ferrimagnetic material having a direction of easy magnetisation perpendicular to the surface of the thin film. During recording it is necessary that the thin film be heated to a temperature above the Curie temperature, or in the case of ferrimagnetic materials to a temperature above the so-called compensation point. When the prior-art device is used the magneto-optical disc is inscribed by applying a magnetic bias field by means of the permanent magnet and by heating the thin film by means of a pulsed laser beam.

SUMMARY OF THE INVENTION

It is an object of the invention to provide a device of the type defined in the opening paragraph, enabling a magneto-optical information carrier to be inscribed with the aid of a pulsating magnetic field in such a way that a comparatively large amount of information can be recorded per unit of time.

To this end the device in accordance with the invention is characterized in that the field generating means of the magnetic unit comprise a coil arranged on a support, the magnetic unit further comprises a further actuator for moving the coil in a direction parallel to the axis of rotation of the turntable. The device further comprising a measurement and control system for determining, during operation of the device, the distance between a reference plane of the magnetic unit and a peripheral surface of the information carrier and for controlling the position of the coil.

The measurement and control system according to the invention includes a detector unit entirely arranged on the support for the coil of the magnetic unit. The detector unit includes elements of different types providing three functions: generating a distance measuring signal for cooperation with a peripheral or other detectable surface of the information carrier; receiving a measurement signal returned or reflected from that carrier, this signal being a measure of the distance between the reference plane of the magnetic unit and that carrier surface; and providing an electric measurement signal responsive to that measurement signal. The electric measurement signal is used by the measurement and control system in determining driving current for the coil.

During operation of the device in accordance with the invention the ferromagnetic or ferrimagnetic film of the information carrier is heated locally with the aid of a continuous-wave or a pulsed laser beam. By driving the coil in conformity with the information to be recorded a desired pulsating magnetic field is produced at the location of the information carrier heated by the laser beam. Since the invention in particular aims at recording a large amount of information per unit of time, for example 6 kbytes/s, the magnetic flux produced by the coil is required to have only a comparatively small maximum value, so that the generated magnetic field is comparatively small. However, owing the presence of the further actuator, it is possible for the coil, even in the case of a rapidly rotating information carrier, for example 300 r.p.m., to be kept accurately at a predetermined distance from the information-carrier side which faces the magnetic unit. This ensures that the pulsating magnetic field produced by the coil is sufficiently strong at the location of the radiation spot formed by the objective. The information recorded by means of the device in accordance with the invention is read optically utilising the Kerr effect.

It is to be noted that it is known from published European Patent Application EP 0,242,837 (herewith incorporated by reference) to use a coil secured to a support as a magnetic unit in a magneto-optical apparatus.

An embodiment of the device in accordance with the invention is characterized in that the measurement and control system comprises at least one optical detector for cooperation with a reflecting surface of the information carrier, which detector comprises a light source and at least one photocell. An advantage of the use of the optical detector is that the measurement proces is without mechanical contact, whilst in addition no magnetic or electric fields are produced which may adversely affect the magneto-optical recording process.

An embodiment, in which detection of the said distance is independent of the reflection coefficient or reflection coefficients of the reflecting surface of the information carrier, is characterized in that the measurement and control system comprises a further optical detector which cooperates with the first-mentioned detector, both detectors being secured to the magnetic unit. Suitably, the detectors are arranged at different levels.

Another embodiment is characterized in that the measurement and control system comprises a capacitive detector for cooperation with an electrically conductive layer of the information carrier, which detector comprises at least one electrode. An advantage of this embodiment is that said distance can be determined without mechanical contact and independently of the reflection coefficient of the information-carrier side facing the magnetic unit. The electrically conductive layer may be situated on or in the information carrier. Magneto-optical information carriers, in particular discs, which have an internal electrically conductive layer of aluminium are known per se. In this respect reference is made to the article "Digital magneto-optic disk drive", T. Deguchi c.s., Applied Optics, Vol. 23, No. 22, Nov. 15, 1984, pp. 3972-3978 (herewith incorporated by reference).

An embodiment in which the distance between the reference surface of the magnetic unit and the of the information-carrier surface is determined mechanically is characterized in that the measurement control system comprises a mechanical detector for cooperation with an information-carrier surface, which detector comprises a slip contact. This enables the position of the coil to be controlled in a purely mechanical way during operation of the device. A further advantage of the use of the mechanical detector is that no requirements have to be imposed on the reflectivity or the electrical conductivity of the information carrier.

Another embodiment, employing a mechanical detector, is characterized in that the measurement and control system comprises an optical sensor for determining the excursion of the slip contact. This has the advantage that only a low contact pressure is required between the slip contact and the cooperating surface of the information carrier.

A further embodiment is characterized in that the measurement and control system comprises a sensor for determining the position of the objective relative to the frame and a further sensor for determining the position of the reference surface of the magnetic unit relative to a reference related to the further slide. An advantage of this embodiment is that by means of the servo-system thus formed the position of the coil during operation is controlled completely independently of the properties of the rotating information carrier.

An embodiment which counteracts the influence of undesired magnetic fields is characterized in that the magnetic unit is provided with a magnetically shielding plate which extends between the further actuator and the coil. Suitably, a plate made of $\mu$-metal can be used for this purpose.

BRIEF DESCRIPTION OF THE DRAWINGS

The invention will now be described in more detail, by way of example, with reference to the accompanying drawings in which.

DESCRIPTION OF THE PREFERRED EMBODIMENTS

Figure 1:
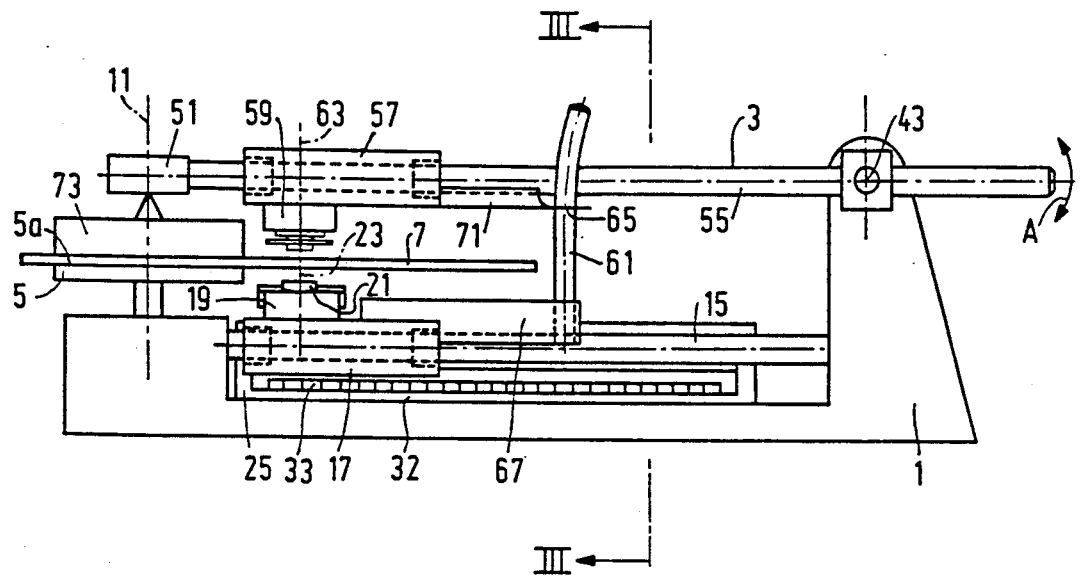
FIG. 1 is a diagrammatic side view of a first embodiment of the device in accordance with the invention.
Figure 2:
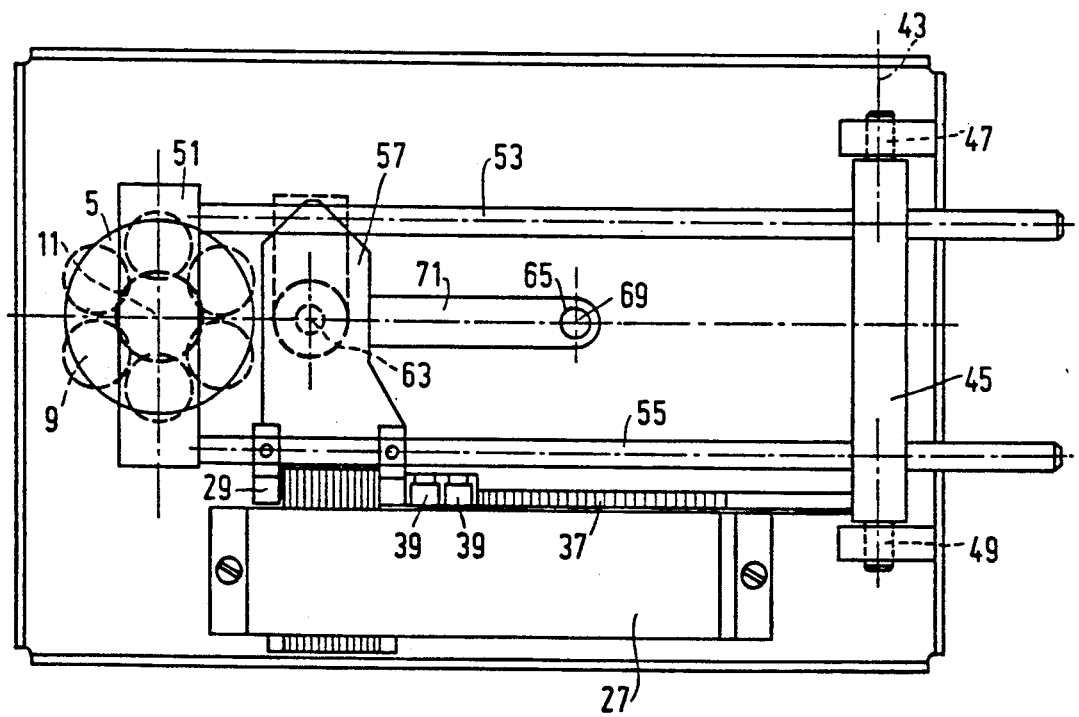
FIG. 2 is a plan view of the embodiment shown in FIG. 1.
Figure 3:
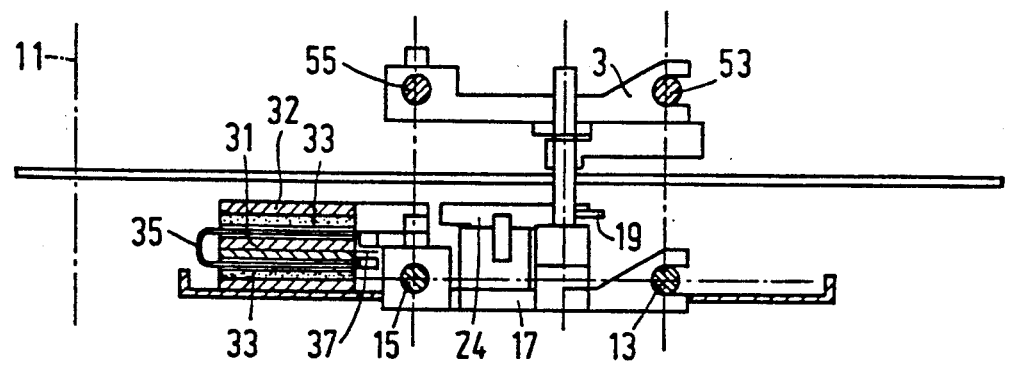
FIG. 3 is a sectional view taken on the line III—III in FIG. 1.

The device in accordance with a first embodiment of the invention is shown in FIGS. 1, 2 and 3, and comprises a frame 1 and a pivotable sub-frame 3. A turntable 5 for supporting and centering a disc-shaped magneto-optical information carrier 7 is arranged in the frame 1. For this purpose the turntable 5 comprises a supporting surface 5a and a centering cone, not shown. An electric motor 9 secured in the frame 1 serves to rotate the turntable 5 about an axis of rotation 11, a speed of for example 2400 revolutions per minute being attainable. Two guide spindles 13 and 15 are arranged on the frame 1 to form rectilinear guide means for a slide 17. The guide spindles 13 and 15 extend parallel to one another and are oriented in such a way that the slide 17 can perform a radial movement relative to the axis of rotation 11 between a position near the turntable and a position remoter from the turntable. The slide 17 carries an optical unit 19, comprising an optical lens or objective 21 having an optical axis 23 and an electromagnetic actuator for driving the objective 21. The electromagnetic actuator may be of a type as is disclosed in European Patent Application 0,268,311 which corresponds to U.S. Pat. No. 4,817,076, issued May 31, 1988, hereby (incorporated by reference). The objective 21 serves for focusing a radiation beam from a radiation source, not shown, for example a laser, to form a radiation spot in the information plane of the information carrier 7. The radiation source may be situated on the slide 17 or elsewhere, for example on the frame 1.

During operation the slide 17 is driven by a linear motor 25, comprising a stator 27 and a movable armature 29. The stator 27 comprises central stator plates 31 and end plates 32 with magnets 33 and is secured to the frame 1. The armature 29 comprises armature coils 35 and is secured to the slide 17. The linear motor 25 may be constructed as a stepping motor. If the motor is not constructed as a stepping motor, as in the present embodiment, the device may comprise an optical ruler 37 secured to the stator 27 and a set of optical emitters and receivers 39 cooperating with said rulers and secured to the armature 29 to detect the position of the slide 17.

The sub-frame 3 is pivotable about a pivotal axis 43 defined by a shaft 45 having two journals 47 and 49 which are supported in the frame 1. The shaft 45 is secured to the sub-frame 3, which comprises two guide spindles 53 and 55 which extend parallel to one another and which are secured to a connecting member 51 of the sub-frame 3. The guide spindles 53 and 55, which extend parallel to the guide spindles 13 and 15 of the frame 1 in the operating position as shown, provide the rectilinear guidance for a slide 57. The slide 57 carries a magnetic unit 59, comprising an element such as a permanent magnet or an induction coil for generating a magnetic field which extends into the information plane of the information carrier 7. The magnetic unit may further comprise an electro-magnetic actuator for moving the element in a direction perpendicular to the information carrier 7. The magnetic unit 59, to which a magnetic axis 63 can be assigned, is situated opposite to and is spaced from the optical unit 19.

The information carrier 7 is situated between the optical unit 19 and the magnetic unit 59, and at least during operation it is important that the optical axis 23 and the magnetic axis 63 are disposed in line with one another. In order to achieve this, the device comprises coupling means for coupling the slides 17 and 57 to one another. In the present embodiment the coupling means comprise a projecting member 61 secured to the slide 17 and a stop 65 arranged on the slide 57 to cooperate with said member. The member 61 is shaped along part of its length like a portion of a toroid. It is secured to the slide via a slide portion 57 which extends in a radial direction. The stop 65 is constituted by the inner bounding wall of an opening 69 formed in a slide member 71 which extends in a radial direction and which is secured to the slide 57. Relative to the member 61 the opening 69 is dimensioned so as to allow pivotal movements of the sub-frame 3 in directions indicated by the double arrow A.

At the location of the connecting member 51 the sub-frame carries a disc-pressure member 73 for pressing the information carrier 7 onto the turntable 5. To enable the information carrier 7 to be placed on or removed from the turntable the disc-pressure member can be moved away from the turntable 5 by pivoting the sub-frame 3.

In the embodiments to be described hereinafter parts corresponding to those in the first embodiment bear the same reference numerals.

Figure 4:
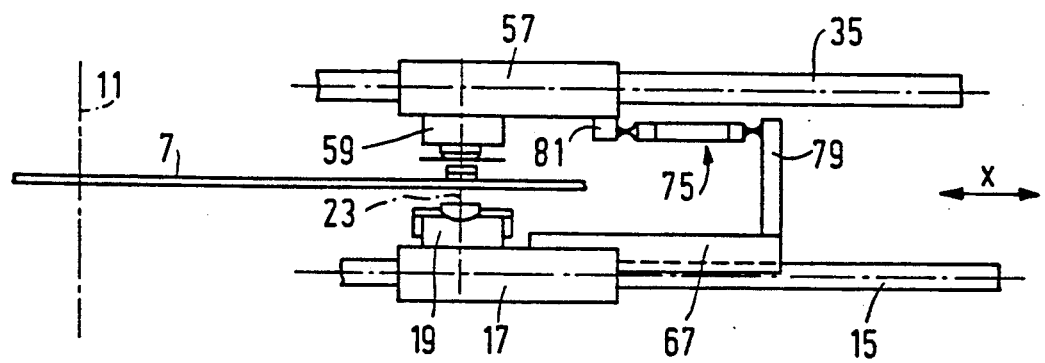
FIG. 4 is a diagrammatic side view showing a part of a second embodiment of the device in accordance with the invention.
Figure 4A:
FIG. 4A is a side view showing a part of the second embodiment.
Figure 4B:
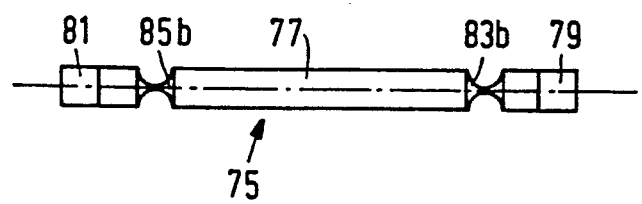
FIG. 4B is a plan view of the part shown in FIG. 4A.

The part of the second embodiment shown in FIG. 4 comprises a slide 17 carrying an optical unit 19 and a slide 57 carrying a magnetic unit 59. The slides 17 and 57 each comprise separate rectilinear guide means, whose respective guide spindles 15 and 55 are shown. The construction of the optical unit 19 and the magnetic unit 59 may correspond to the construction of the relevant units of the device shown in FIGS. 1, 2 and 3. The slide 17 can be driven by a stepping motor or otherwise. The slides 17 and 57 are coupled to each other by means of a double-hinged-link 75, which has one end connected to a slide member 67 of the slide 17 and its other end to the slide 57. The link 75 comprises a central elongate portion 77, two end portions 79 and 81, and two pairs of elastic hinges 83A, 83B and 85A, 85B, extending between the parts 77 and 79 and between the parts 77 and 81 respectively. The hinges 83A and 85A have a hinge axis which is oriented transversely of the optical axis of the optical unit 19 and transversely of the direction of movement X of the two slides. The hinges 83B and 85B each have a hinge axis parallel to said optical axis 23. The hinge construction 75 allows a pivotal movement of the slide 57 relative to the slide 17 and is sufficiently rigid in the X direction to guarantee an accurately defined coupling between the two slides 17 and 57.

Figure 5:
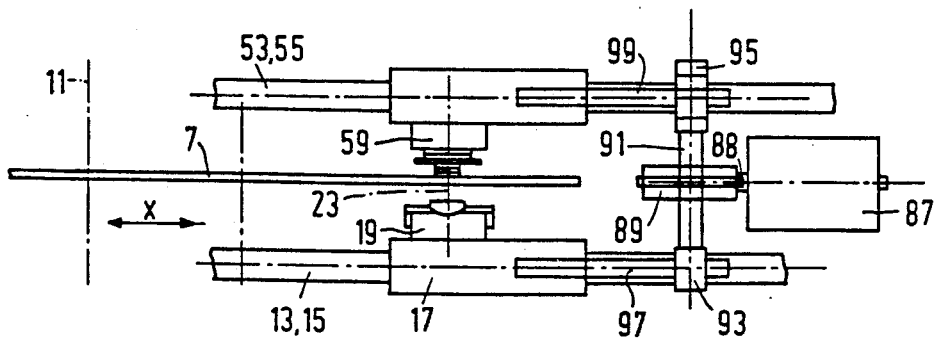
FIG. 5 is a diagrammatic side view showing a part of a third embodiment of the device in accordance with the invention.

The part of the third embodiment of the device in accordance with the invention shown in FIG. 5, like the preceding embodiments, comprises a frame and a sub-frame which is secured to the relevant frame so as to be translatable or pivotable. The device comprises a slide 17 carrying an optical unit 19 and a slide 57 carrying a magnetic unit 59. Both slides are moved over rectilinear guide means, bearing the reference numerals 13, 15 and 53, 55, parallel to an information carrier 7 which extends between the two units 19 and 59. An electric motor 87 secured to the frame provides the drive for the two slides 17 and 57. The motor 87 comprises a motor shaft 88, which cooperates with a transmission mechanism 89, for example a worm wheel and gear wheel transmission which cooperates with a drive shaft 91. At each end the drive shaft 91, which extends parallel to the optical axis 23 of the optical unit 19, carries a pinion 93 and 95 respectively. The slide 17 is provided with a gear rack 97 which extends in the driving direction X and the slide 57 is provided with a gear rack 99 which extends parallel thereto. Since the gear rack 97 cooperates with the pinion 93 and the gear rack 99 cooperates with the pinion 95, the slides 17 and 57 can be moved concurrently and synchronously by one motor, so that the desired radial position of the optical unit 19 and the magnetic unit 59 relative to one another is guaranteed during operation.

Figure 6:
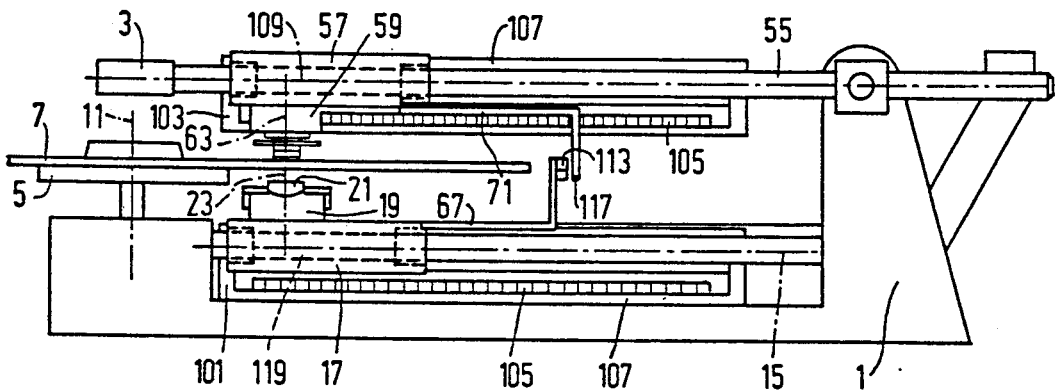
FIG. 6 is a diagrammatic side view of a fourth embodiment of the device in accordance with the invention.
Figure 7:
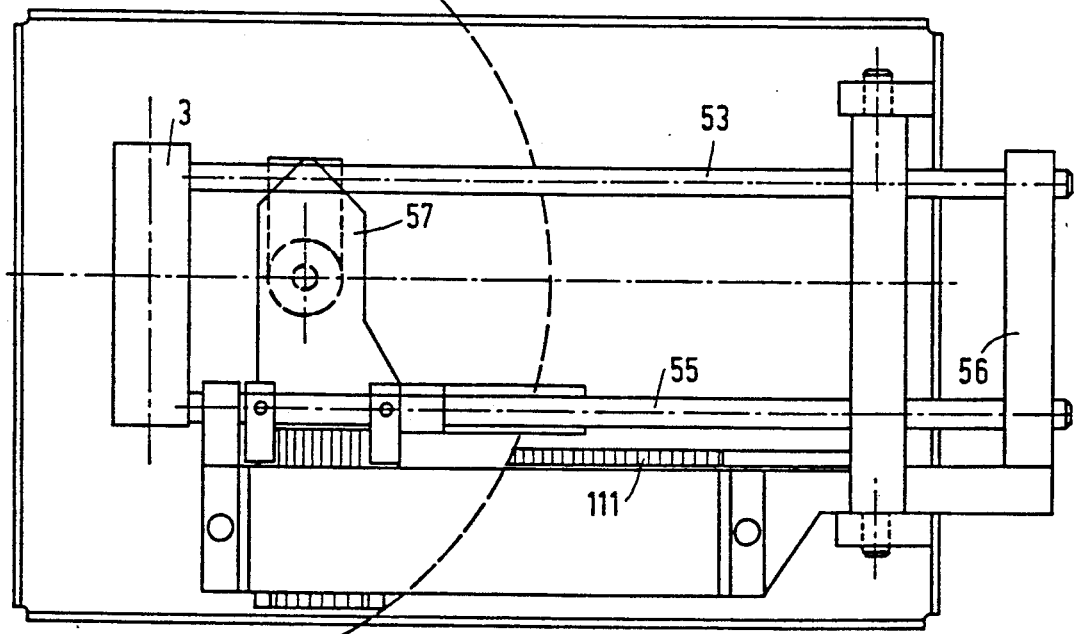
FIG. 7 is a plan view of the embodiment shown in FIG. 6.

The fourth embodiment of the device in accordance with the invention shown in FIGS. 6 and 7 comprises a frame 1 comprising two parallel guide spindles, of which only one spindle, bearing the reference numeral 15, is shown, and a pivotable sub-frame 3 comprising two guide spindles 53 and 55, which engage against a stop element 56 of the frame 1 during operation. The guide spindles of the frame 1 serve for guiding and supporting a slide 17 and the guide spindles 53 and 55 serve for guiding and supporting a slide 57. The slide 17 carries an optical unit 19 comprising an objective 21 having an optical axis 23 and an electro-magnetic actuator for moving the objective along the optical axis 23. A magnetic unit 59 having a magnetic axis 63 is suspended from the slide 57. A turntable 5, which is supported in the frame 1, carries a magneto-optical information carrier 7 at least during operation. The slides 17 and 57 are driven in radial directions independently of one another. For this purpose each slide is coupled to a linear motor 101 and 103 respectively. Both motors 101 and 103 each comprise a stator, having a magnet 105 and a stator yoke 107, and an armature, having one or more coils 109. For the purpose of position detection one of the two motors, for example the linear motor 101 is provided with an incremental measurement ruler 111 and an optical sensor which cooperates therewith. In order to guarantee an optimum cooperation between the optical unit 19 and the magnetic unit 59 during recording on the magneto-optical information carrier 7 the device comprises a measurement and control system for positioning the optical unit and the magnetic unit relative to one another at least during operation. The measurement and control system comprises an optical distance meter (opto-coupler) 113 arranged on a slide member 67 of the slide 17 and a reflecting surface 117 arranged on a slide member 71 of the slide 57. The optical distance meter 113 is arranged opposite the reflecting surface 117 and is connected to an electronic control unit.

Figure 8:
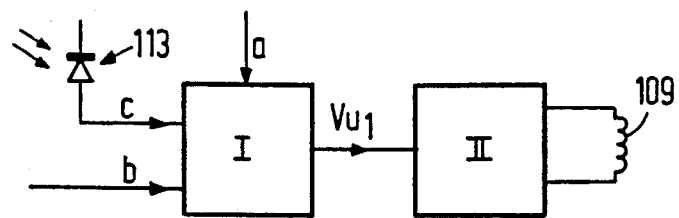
FIG. 8 shows diagrammatically the measurement and control system employed in the fourth embodiment.

The measurement and control system employed in the device shown in FIGS. 6 and 7 will be described in more detail with reference to FIG. 8. A signal a from a player control system is applied to a controller I to establish the correct initial conditions such as bringing the reflecting surface within the measurement range of the opto-coupler after the device has been switched on. Moreover, a signal b corresponding to the desired slide position (set-point) is applied to the controller I. The optical distance meter 113 supplies a signal c to the controller I, the value of this signal being dependent on the distance from the reflecting surface 117. In the controller I the signal c is compared with the signal b, the controller ensuring that the system has the desired stability and that the slides 17 and 57 are accurately in track with one another. The controller I supplies an output voltage Vu1 to an output amplifier II, which drives the coil 109 of the linear motor 103.

Figure 9:
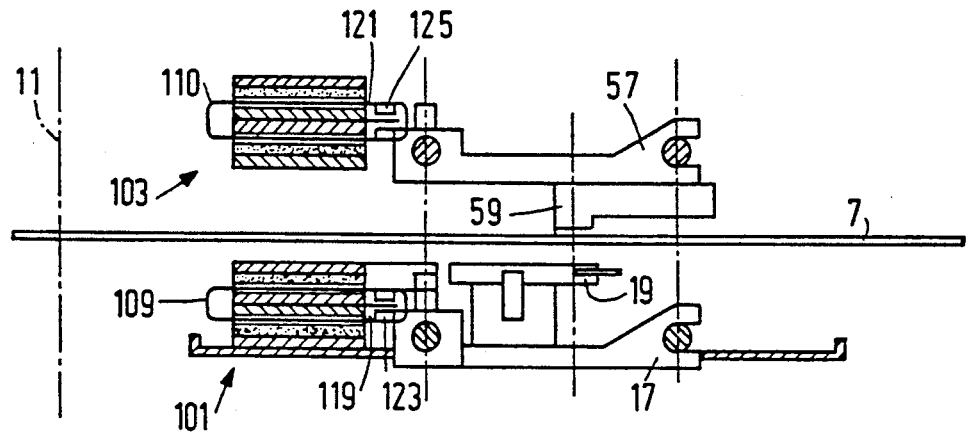
FIG. 9 is a diagrammatic cross-sectional view showing a part of a fifth embodiment of the device in accordance with the invention.

The part of the fifth embodiment of the device in accordance with the invention shown in FIG. 9 comprises a slide 17 carrying an optical unit 19 and a slide 57 carrying a magnetic unit 59. The two slides are guided similarly to those in the embodiments already described hereinbefore. Each slide is driven by a separate linear motor, 101 and 103 respectively, each motor being provided with an incremental measurement ruler 119 and 121 respectively and an optical detector 123 and 125 cooperating therewith. The optical detectors 123 and 125 each have two emitters at one side of the relevant optical incremental ruler and two receivers at the other side of the relevant ruler and are electronically coupled to one another by a microprocessor.

Figure 10:
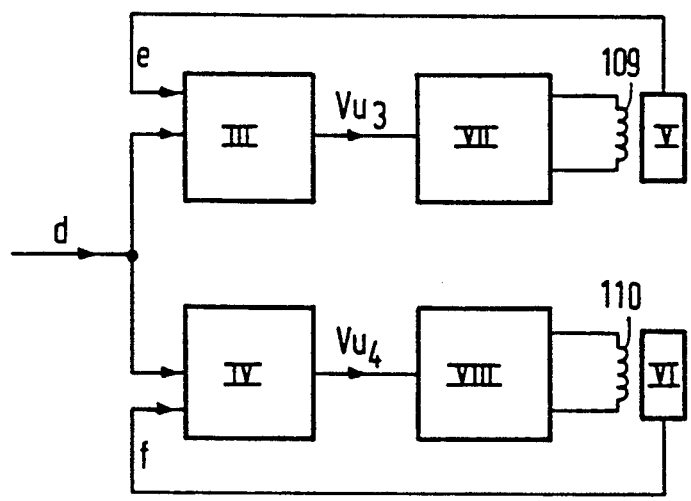
FIG. 10 shows diagrammatically the measurement and control system used in the fifth embodiment.

The measurement and control system of the device shown in FIG. 9 will be described in greater detail with reference to FIG. 10. The measurement and control system comprises two controllers III and IV, a player control system supplying a signal d related to the desired slide position to each of said controllers. A position-measurement unit represented by V and VI, is coupled to the controllers III and IV respectively. From the position-measurement unit V the controller III receives a signal e which is related to the actual position of the slide 17 and from the position-measurement unit VI the controller IV receives a signal f which is related to the actual position of the slide 57. The controllers III and IV provide the desired stability of the two parallel sub-systems and the desired tracking accuracy, the signals d and e being compared with one another in the controller III and the signals d and f being compared with one another in the controller IV. The controllers III and IV apply an output voltage Vu3 and Vu4 respectively to an output amplifier VII and VIII respectively. The output amplifier VII energises the coil 109 of the linear motor 101 and the output amplifier VIII energises the coil 110 of the linear motor 103.

Figure 11:
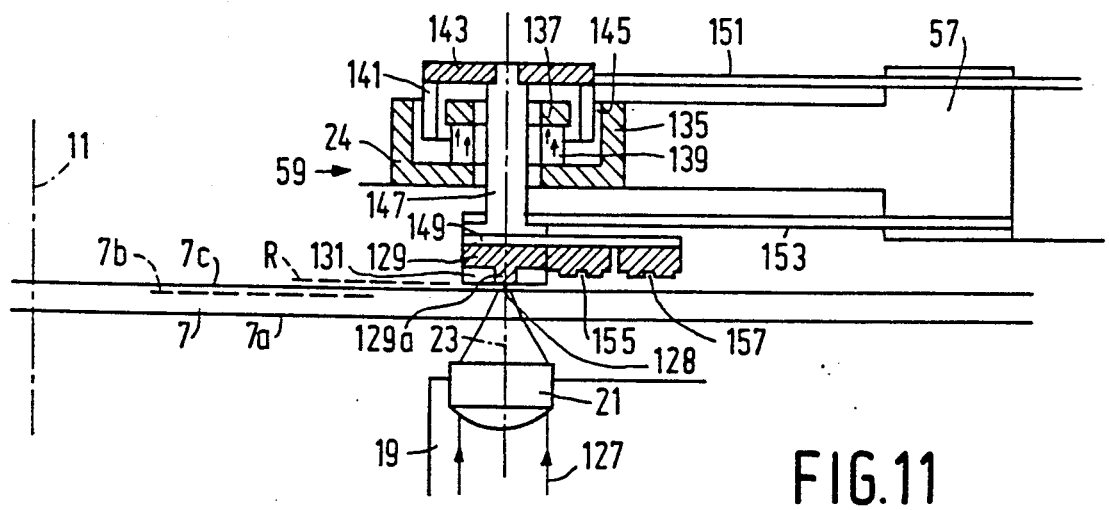
FIG. 11 is a diagrammatic longitudinal sectional view showing a part of a sixth embodiment of the device in accordance with the invention.

The embodiment of the device in accordance with the invention which is shown in part in FIG. 11, is a modification of the device shown in FIGS. 1, 2 and 3. Similarly to that described above, it comprises a frame, a sub-frame, a slide carrying an optical unit 19, and a slide 57 carrying a magnetic unit 59. For a comprehensive description of these parts of the device reference is therefore made to the paragraphs relating to FIGS. 1, 2 and 3. FIG. 11 shows the objective 21 of the optical unit 19, which objective has an optical axis 23. The objective 21 is arranged at the transparent side 7a of a magneto-optical disc 7, which is rotatable about an axis of rotation 11. The magneto-optical disc 7 comprises a composite information layer 7b. By means of the objective a radiation beam 127, which is directed to the objective, can be converged to form a radiation spot 128 in the information layer 7b. A magnetic unit 59 is arranged opposite the objective 21 at the other side of the optical information carrier 7. In this embodiment the magnetic unit comprises a coil 131, arranged on a coil former or support 129, and an electro-magnetic actuator 24 for moving the coil 131 in a direction parallel to the axis of rotation 11 of the turntable 5 (FIG. 1). The support 129 is suitably made of a ferrite and has a central portion 129a which is directed towards the objective 21 and which carries the coil 131. When the coil 131 is energised a magnetic field is produced such that the lines of field emerge from the central portion 129a and intersect the information layer 7b substantially perpendicularly.

The actuator 24 comprises an axially magnetised magnet 139 arranged between magnetically conductive portions 135 and 137. The actuator 24 further comprises an actuator coil 141, which is secured to a coil holder 143 and which is axially movable in an annular air gap 145 bounded by the portions 135 and 137. The coil holder 143 is secured to an actuator spindle 147 whose end which is remote from the coil holder 143 is provided with a supporting element 149 to which the support 129 is secured. The actuator portions 135, 137 and 139 are secured directly to the slide 57 and the portions 141, 143, and 147 are together supported by two leaf springs 151 and 153 secured to the slide 57.

The device shown in FIG. 11 further comprises a measurement and control system for determining, during operation of the device, the distance between a reference plane of the magnetic unit 59, for example the side of the coil 131 or the central portion 129a facing the objective and bearing the reference R in the Figure, and the side 7c of the information carrier 7 facing the magnetic unit. The measurement and control system also serves for adjusting the desired position of the coil 131. The measurement and control system which is used comprises two juxtaposed optical detectors 155 and 157 which are secured to the supporting element 149 and together are situated adjacent the coil 131. The two optical detectors 155 and 157 together form an emitter for emitting an optical beam and two receivers for receiving the radiation reflected from the side 7c of the information carrier 7.

Figure 12:
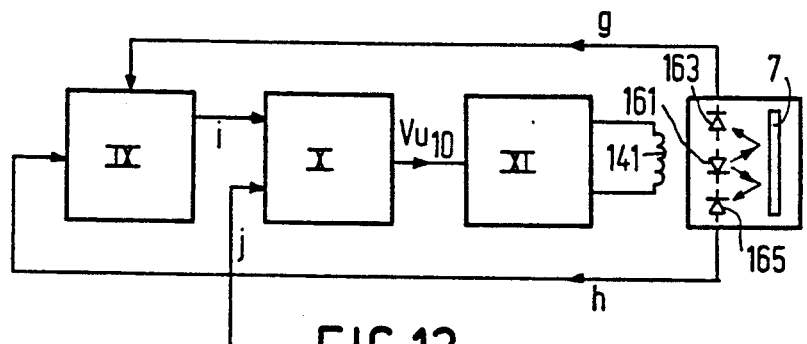
FIG. 12 shows diagrammatically the measurement and control system used in the sixth embodiment.

The measurement and control system used in the device shown in FIG. 11 will be described in greater detail with reference to the block diagram shown in FIG. 12. The emitter mentioned in the preceding paragraph bears the reference numeral 161 and the two receivers bear the reference numerals 163 and 165. The receiver 163 is a reference diode and the receiver 165 is a measurement diode. The magneto-optical information carrier bears the reference numeral 7. A reference current g from the reference diode 163 and a measurement current h from the measurement diode 165 are applied to a unit IX. The unit IX supplies a normalised signal i, which is applied to a controller X. A signal j which is related to the desired position of the coil 131, is applied to the controller X by a player control system. The controller X provides the desired stability of the system and controls the desired distance from the optical disc 7, the signals i and j being compared with one another in the controller X. The controller X supplies an output voltage Vu10 to an output amplifier XI. The coil 141 of the actuator 24 is energised by the output amplifier XI.

Figure 13:
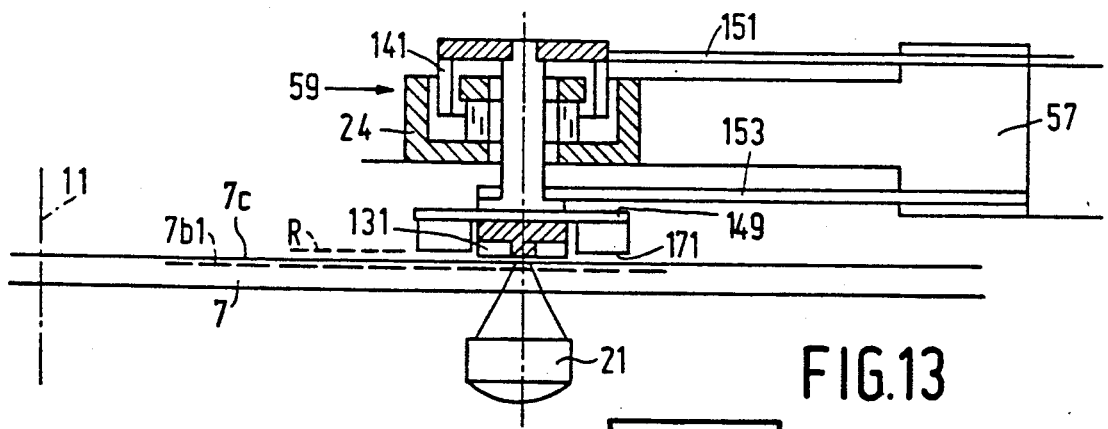
FIG. 13 is a diagrammatic longitudinal sectional view of a part of a seventh embodiment of the device in accordance with the invention.

The embodiment of the device in accordance with the invention, which is shown in part in FIG. 13, is also a modification of the device as shown in FIGS. 1, 2 and 3. The principal difference with the embodiment shown in FIG. 11 is that the present embodiment comprises a capacitive detector 171 instead of the optical detectors 155 and 157. The capacitive detector 171 comprises an electrically conductive ring, for example made of phosphor-bronze, and cooperates with a conductive layer 7b1, which may be one of the constituent layers of the information layer 7b. For the remainder the construction and mechanical operation of this embodiment may be similar to that shown in FIG. 11. For a more detailed description of this embodiment reference is made to the paragraphs relating to FIG. 11. The capacitive detector 17 forms part of a measurement and control system for determining, during operation of the device, the distance between a reference surface of the magnetic unit 59, for example the side of the coil 131 facing the objective 21 and bearing the reference R in the Figure, and the side 7c of the information carrier 7 facing the magnetic unit, the system also serving to control the desired position of the coil 131. The capacitive detector 171 is secured to the supporting element 149 of the actuator 24.

Figure 14:
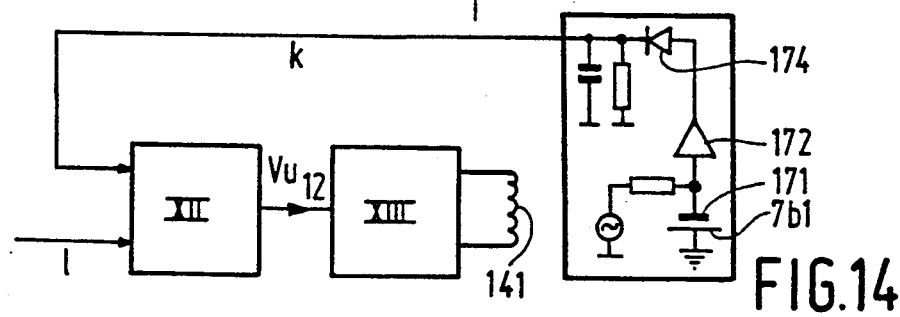
FIG. 14 shows diagrammatically the measurement and control system employed in the seventh embodiment.

FIG. 14 shows the block diagram of the measurement and control system employed in the device shown in FIG. 13. In said Figure the capacitive detector has the reference numeral 171 and the conductive layer of the information carrier bears the numeral 7b1. The detector 171 supplies a measurement signal which is related to the actual position of the coil 131 and which is applied to a buffer amplifier 172 and subsequently rectified by a rectifier 174. The rectified measurement signal k is applied to a controller XII and in the controller XII it is compared with a signal l related to the desired position. The controller XII supplies an output voltage Vu12 and is electrically connected to an output amplifier XIII. The output amplifier XIII energises the coil 141 of the actuator 24.

Figure 15:
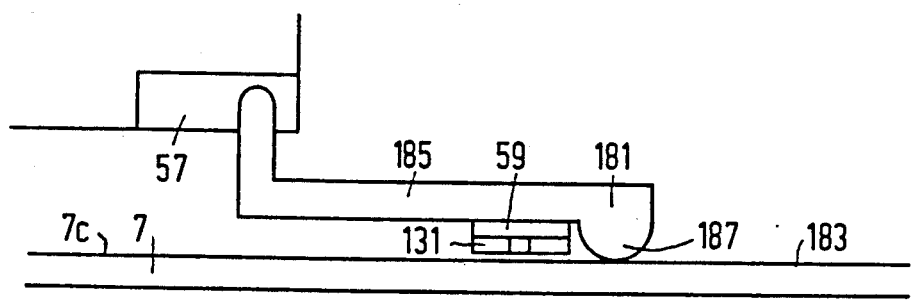
FIG. 15 shows diagrammatically a part of an eighth embodiment of the device in accordance with the invention.

FIG. 15 shows a part of a further embodiment of the invention. This embodiment is again a modification of the device as shown in FIGS. 1, 2 and 3. The measurement and control system in the present embodiment comprises a mechanical detector 181 for cooperation with a peripheral surface 183 of the information carrier 7. The mechanical detector comprises a supporting arm 185 which is pivotally secured to the slide 57 and which carries a slip contact 187 which bears on the information carrier during operation. The supporting arm 185 carries the magnetic unit 59, which comprises a coil 131. During operation the slip contact 187 follows the peripheral surface 183 of the rotating information carrier 7, to detect irregularities in this peripheral surface, which cause a pivotal movement of the supporting arm 185. The coil 131 of the magnetic unit 59, which coil is arranged on the supporting arm 185, follows the movements of the pivotal arm, thereby guaranteeing a predetermined distance between the coil 131 and the peripheral surface 7c of the information carrier 7.

Figure 16:
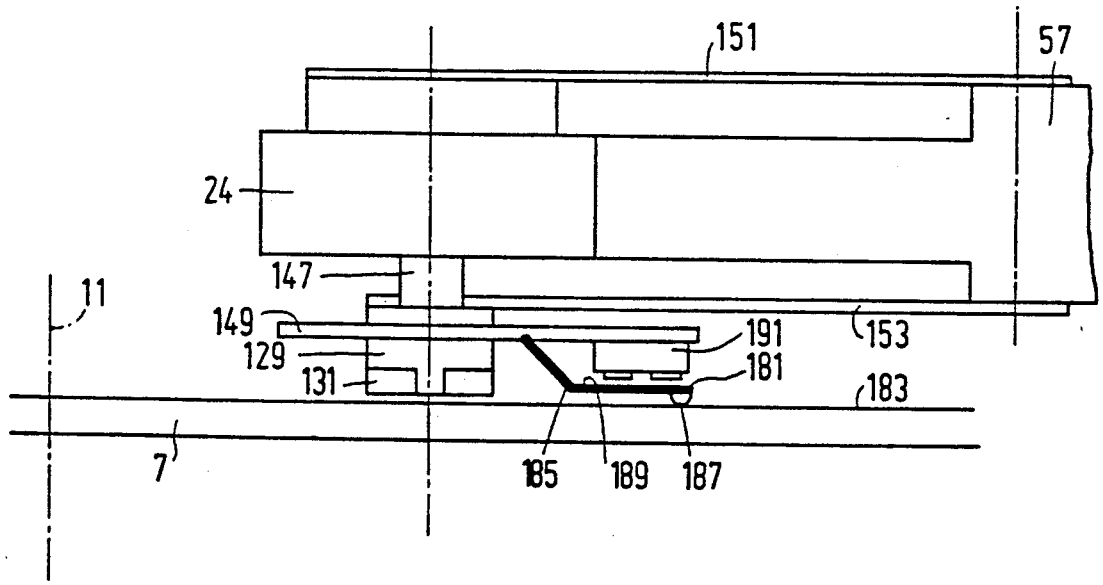
FIG. 16 shows diagrammatically a part of a ninth embodiment of the device in accordance with the invention.

The part of the ninth embodiment of the device in accordance with the invention shown in FIG. 16 is a modification of the part shown in FIG. 11. The present embodiment comprises an actuator 24, which may be of a construction similar to that of the actuator shown in FIG. 11. The actuator 24 is connected partly directly to the slide 57 and partly via two blade springs 151 and 153 and comprises an axially movable actuator spindle 147 with a supporting element 149. The supporting element carries a coil former or support 129, made of for example a ferrite, with a coil 131 for producing a magnetic field. The embodiment further comprises a mechanical detector 181, which is pivotally connected to the supporting element 149 and which is provided with a slip contact 187 which in operation engages with a peripheral surface 183 of a rotating information carrier 7. The mechanical detector 181 further comprises a supporting arm 185 having a reflecting surface 189. An optical sensor 191 secured to the supporting element 149 is arranged opposite the reflecting surface 189 to detect excursions of the slip contact 187. The optical sensor 191 forms part of a measurement and control system for controlling the desired position of the coil 131. The measurement and control system is comparable to the system shown in FIG. 12. Since the reflecting surface 189 can be uniquely defined it is not necessary to provide a reference diode.

Figure 17:
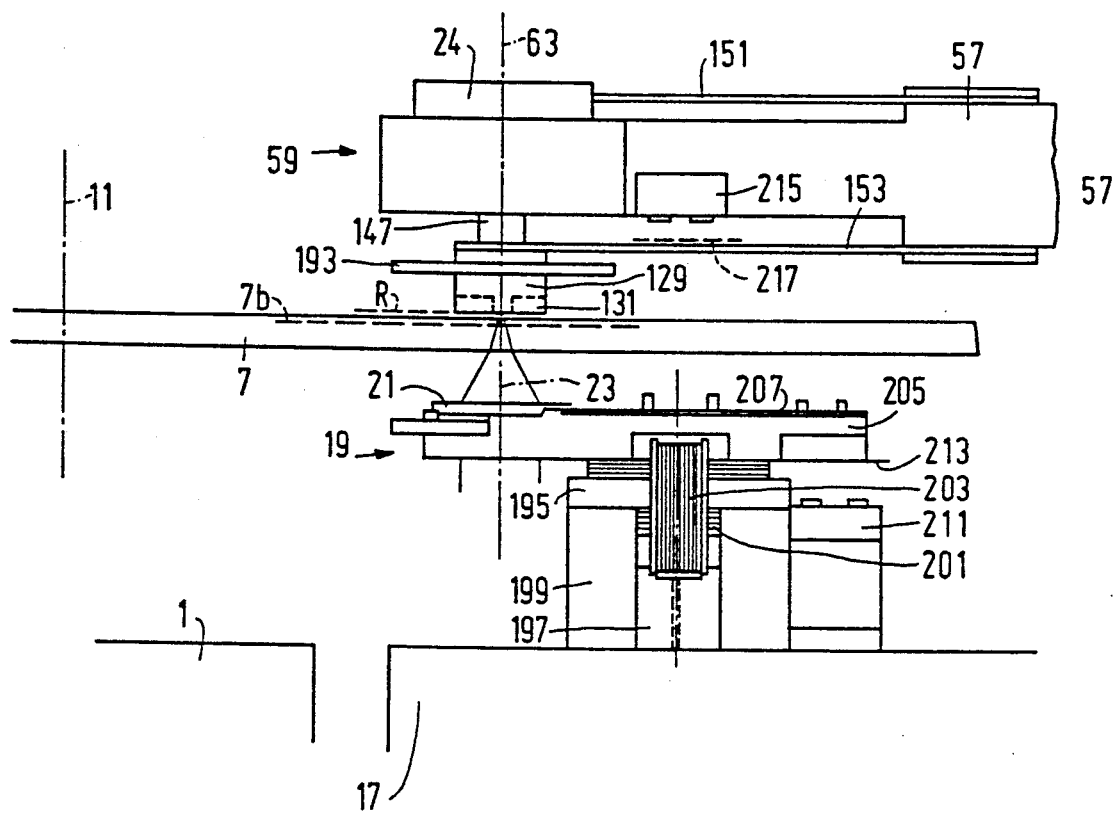
FIG. 17 is a diagrammatic longitudinal sectional view showing a part of a tenth embodiment of the device in accordance with the invention.

FIG. 17 shows a part of the tenth embodiment of the device in accordance with the invention. This embodiment is another modification of the device as shown in FIGS. 1, 2 and 3. The embodiment comprises a slide 17 carrying an optical unit 19 and a slide 57 carrying a magnetic unit 19. The slide 17 is supported in a frame corresponding to the frame of the device shown in FIGS. 1, 2 and 3, and the slide 57 is supported in a pivotable sub-frame corresponding to the sub-frame 3 in the device shown in FIGS. 1, 2 and 3. The magnetic unit 19 comprises an actuator which is similar to the actuator 24 of the device shown in FIG. 11. The actuator comprises a stationary section, which is secured directly to the slide 57, and a movable section, which is connected to the slide 57 by blade springs 151 and 153. The actuator 24 comprises an actuator spindle 147 which is movable along its longitudinal axis and which carries a magnetically shielding plate 193, suitably made of a μ-metal. The actuator spindle 147 further carries a ferrite coil former or support 129 with a coil 131 for generating a fluctuating magnetic field.

The optical unit 19 comprises an actuator 195, which comprises a stationary section, comprising with a permanent magnet 197 and a magnetic yoke 199, and a movable section, comprising with a focusing coil 201 and tracking coils 203. The movable section of the actuator 195 further comprises a supporting member 205, in which an objective 21 having an optical axis 23 is mounted. At its side which faces the magnetic unit 59 the optical unit 19 may be magnetically shielded by means of a μ-metal plate 207, which is for example disc-shaped or annular.

The device shown in FIG. 17 comprises a measurement and control system comprising a sensor 211 for detecting the position of the objective 21 relative to the frame 1. The sensor 211, which in the present example is an optical distance detector, is secured to the stationary section of the actuator 195 and cooperates with a reflecting surface 213 provided on the supporting member 205 of the movable part of the actuator 195, which member is movable along the optical axis 23. The stationary section of the actuator 24 or the directly adjoining part of the slide 57 carries a further sensor 215, in the present embodiment also an optical distance detector, which cooperates with a reflecting surface 217, which in the present example is provided on the blade spring 153, which is coupled to the movable part of the actuator 24.

Figure 18:
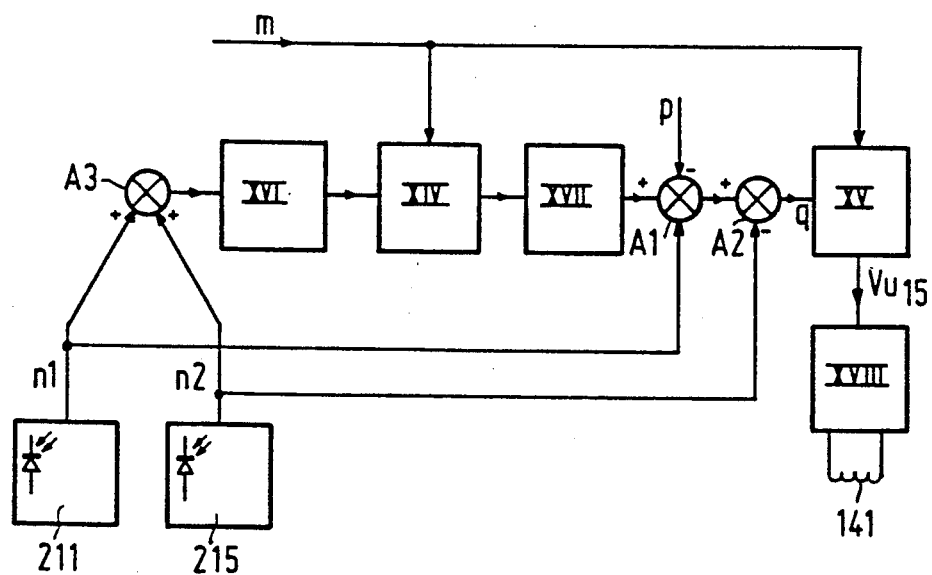
FIG. 18 shows diagrammatically the measurement and control system employed in the tenth embodiment.

The measurement and control system of the device shown in FIG. 17 will now be described in greater detail with reference to the block diagram shown in FIG. 18 and the part shown in FIG. 17. By means of a player control system, not shown, a specific routine is carried out during starting of the device. This routine may include inter alia that the objective 21 is set to a suitable focusing position and the magnetic unit 59 is briefly pressed against the information carrier 7 to be inscribed or to be read. The signal m from the player control system activates a memory XIV. Said sensor 211 and 215, which convert the distance from the reflecting surfaces 213 and 217 respectively into voltage signals n1 and n2, are connected to a controller XV and analog-to-digital converter XVI, which is coupled to the memory XIV, via adders A1, A2 and A3, in a manner as shown in the block diagram. The memory XIV is coupled to the controller XV as shown via the adders A1 and A2 and a digital-to-analog converter XVII. Moreover, a signal p, which is related to the desired value of the distance between the magnetic unit 51, in particular its reference surface R, and the magneto-optical information carrier 7, in particular its information surface 7b, is applied to the adder A1. The signal q from the adder A2 is applied to the controller XV, the controller XV ensuring that the system has the desired stability and said desired value is maintained accurately. The controller XV is connected to an output amplifier XVIII and has an output voltage Vu15. The output amplifier XVIII drives the coil 141 (see FIG. 11) of the actuator 24 of the magnetic unit 59. This enables a measurement and control system to be realised which does not make use of the rotating information carrier 7.

It is to be noted that the invention is not limited to the embodiments shown and described herein. It is obvious that further embodiments are possible within the scope of the present invention.

We claim:

1. a device for inscribing and/or reading a magneto-optical information carried having a reflecting surface, comprising:
   a frame; a turntable for supporting a magneto-optical information carried placed thereon; means for mounting said turntable to said frame for rotation about an axis of rotation,
   an optical unit, including means for producing a radiation beam, and objective for concentrating the radiation beam to form at least one radiation spot in focusing plane; and an actuator for moving the objective in a direction parallel to said axis of rotation,
   a magnetic unit arranged opposite to and spaced from the optical unit, comprising means for generating a magnetic field which extends into said focusing plane, said means for generating including means for defining a reference plane; and a further actuator for moving said means for generating in a direction parallel to said axis of rotation,
   a measurement and control system for determining, during operation of the device, a distance between said reference plane of the means for generating and said reflecting surface, and for controlling said further actuator in response to determination of said distance, and
   means for moving said optical unit and said magnetic unit in a plane transverse to said axis of rotation,
   characterized in that said measurement and control system comprise a detector unit including two optical detectors arranged for cooperation with said reflecting surface, both detectors being secured to the magnetic unit for movement of the entire detector unit with the magnetic unit, and said two detectors together comprising at least one light source, a reference photocell and a measurement photocell.

2. A device as claimed in claim 1, characterized in that said measurement and control system further comprises a controller for receiving a signal related to a desired position of the means for generating, and
   means for receiving a reference current from the reference photocell and a measurement current from the measurement photocell, and for supplying a normalized signal to said controller.

3. A device as claimed in claim 2, characterized in that said two detectors together comprise one light source only.

4. a device as claimed in claim 1, characterized in that said two detectors together comprise one light source only.

5. A device for inscribing and/or reading a magneto-optical information carrier having a detectable surface, comprising:
   a frame; a turntable for supporting a magneto-optical information carried place thereon; and means for mounting said turntable to said frame for rotation about an axis of rotation,
   an optical unit, including means for producing a radiation beam; an objective for concentrating the radiation beam to form at least one radiation spot in a focusing plane; and an actuator for moving the objective in a direction parallel to said axis of rotation,
   a magnet unit arranged opposite to and spaced from the optical unit, comprising first means for generating a magnetic field which extends into said focusing plane, said first means for generating including means for defining a reference plane; a supporting element supporting said first means for generating; and a further actuator for moving said supporting element with said first means for generating in a direction parallel to said axis of rotation,
   a measurement and control system for determining, during operation of the device, a distance between said reference plane of the first means for generating and said detectable surface, and for controlling said further actuator in response to determination of said distance, and means for moving said optical unit and said magnetic unit in a plane transverse to said axis of rotation, characterized in that said measurement and control system comprises:

a detector unit entirely arranged on said supporting element for providing an electrical measurement signal responsive to said distance, said detector unit comprising second means for generating a distance measuring signal for cooperation with said detectable surface; means for receiving a measurements signal return from said carrier, said measurement signal being a measure of said distance; and means for providing an electrical measurement signal responsive to said measurement signal, and means, responsive to said electrical measurement signal, for energizing said further actuator.

6. A device as claimed in claim 5, characterized in that said detectable surface of the information carrier is a reflecting surface, said second means for generating comprises an emitter for emitting an optical beam, and said means for receiving comprises a receiver for a radiation beam reflected from reflecting surface, said second means and said receiver being parts of an optical detector.

7. A device as claimed in claim 6, characterized in that said means for energizing comprises a controller for receiving a signal related to the desired position of the first means for generating during operation of the device, and for receiving a signal related to said electrical measurement signal; and an output amplifier connected to said controller to energize said further actuator.

8. A device as claimed in claim 7, characterized in that said detector unit comprises a further optical detector which, together with said one optical detector, are formed by emitter and two receivers; and said measurement and control unit further comprises means for receiving a reference current from one said receivers, and a measurement current from the other receiver, and means for supplying a normalized signal to said controller.

9. A device as claimed in claim 5, characterized in that said detectable surface is a conductive layer within said information carrier, and said means for receiving and second means for generating together comprise at least one electrode for cooperation with said conductive layer.

10. a device as claimed in claim 5, characterized in that said second means for generating comprises a mechanical detector, comprising a slip contract for cooperation with said information-carrier external surface.

11. A device as claimed in claim 10, characterized in that said means for receiving and second means for generating together comprise an optical sensor arranged for determining an excursion of the slip contact.

* * * * *